Aug. 16, 1938.  W. H. MARTIN  2,126,903

WELDING APPARATUS

Filed Dec. 3, 1936  4 Sheets-Sheet 1

Inventor
William H. Martin
By Hans F. Crampton
Attorney

Aug. 16, 1938.  W. H. MARTIN  2,126,903
WELDING APPARATUS
Filed Dec. 3, 1936  4 Sheets-Sheet 2

Inventor
William H. Martin
By [signature]
Attorney

Aug. 16, 1938.  W. H. MARTIN  2,126,903
WELDING APPARATUS
Filed Dec. 3, 1936  4 Sheets-Sheet 4

Inventor
William H. Martin
By (signature)
Attorney

Patented Aug. 16, 1938

2,126,903

UNITED STATES PATENT OFFICE 2,126,903

WELDING APPARATUS

William H. Martin, Detroit, Mich.

Application December 3, 1936, Serial No. 114,066

18 Claims. (Cl. 219—4)

My invention relates to a welding apparatus. It has for its object to provide a hydraulically operated welder having a power means for circulating a cooling liquid through parts of the welder in which the welding current is induced by the primary of a transformer mounted on the welder and for operating a pressure device that transmits power hydraulically to simultaneously produce the required welding pressure on the work and yet produce such a movement of the welding points to the work as to prevent mushrooming of the points. The invention also provides a hydraulic means automatically operated by the pressure of the liquid to cause the flow of the welding current through the welding terminals when the required welding pressure has been produced.

The particular object of the invention is to provide a light weight portable apparatus and a light weight manually supportable welder wherein the actuating pressure is transmitted through a confined liquid located intermediate a pair of reciprocable members, one of which may be operated by a continuously driven motor, the other of which is mechanically connected to a welder terminal for producing movement of the welding terminal to engage the work.

The invention provides a liquid circulating and cooling means, a hydraulic pressure means actuated by the power means operating through a mechanical means to produce the welding pressure that is hydraulically transmitted to the welder, and a pressure means that counteracts, with a substantially fixed pressure above the welding pressure, the movement of the liquid caused by the displacement of the liquid in the operation of the power means subsequent to the production of the welding pressure and subsequent to the initiation of the flow of the welding current.

The invention also has for its object to eliminate hammering of the conductor terminals against the work and prevent mushrooming of the terminals and the consequent spreading of the area of the contact of the terminals through which the welding current flows.

The welder is provided with a light weight transformer for transforming a relatively high potential, high frequency current into a welding current of low potential and large amperage in a secondary located in close current conductive relation to the welding terminals which eliminates large current conductive cables, large heat loss, and large potential drop. By mechanically operating the hydraulic means, such as by a cam, and hydraulically transmitting the pressure, a small light weight cylinder and piston may be used in a manually portable and a manually manipulated welder for producing welds. The use of the liquid of the hydraulic means as a cooling means and the use of the cylinder and piston as parts of the secondary in which the welding current is induced and to which the liquid is necessarily conducted, eliminates rigid air conductors and further reduces the restriction to ease of manipulation of the welder. By the use of the pressure of the liquid to automatically cause the welding current to flow when the pressure reaches a predetermined point, the liquid performs the triple function of cooling the parts of the welder through which the welding current flows, transmitting the welding pressure from a positively operating motor means, and causing the welding current to flow only during existence of a welding pressure on the work.

The invention thus eliminates many cumbersome and heavy parts ordinarily connected or mounted on or forming parts of the welders commonly used which hamper their manipulation. A light-weight and substantially non-expansible tube may be used for conducting the liquid to the welder, and the large metal conductors, air pipes, and water cooling pipes may all be eliminated. Also hammering, commonly produced by air operated welding apparatuses or welders, is eliminated.

The invention also provides means for producing a continuous flow as distinct from an intermittent flow of a fluid in heat conductive relation with respect to the primary and secondary circuits of the welder transformer and the welding points of the welder, whereby continuous rapid welding operations or "stitching" for long periods may be performed.

The invention consists in other features which will appear from the following description and upon examination of the drawings. Structures containing the invention may partake of different forms and may be varied in their details and still embody the invention. To illustrate a practical application of the invention, I have selected a welding apparatus and a modified form thereof as examples of the various structures that contain the invention and shall describe the selected structures hereinafter, it being understood that certain features of the invention may be used to advantage without a corresponding use of other features of the invention and without departing from the spirit of the invention as presented in the claims. The apparatus selected is shown in the accompanying drawings.

This application is a continuation in part of the application Serial No. 56,142 filed December 26, 1935 for Welding apparatus, that resulted in Patent No. 2,063,258 on December 8, 1936.

Figs. 11, 12, and 13 illustrate the modified form of apparatus shown in the other figures.

In the particular form of apparatus shown in Figs. 1 to 10, the welder 1 is provided with the welding points or terminals 2 and 4 that engage and clamp the work 5 and are pressed thereagainst at a pressure such as to produce the required welding pressure that is hydraulically transmitted to the welder.

Figure 4:
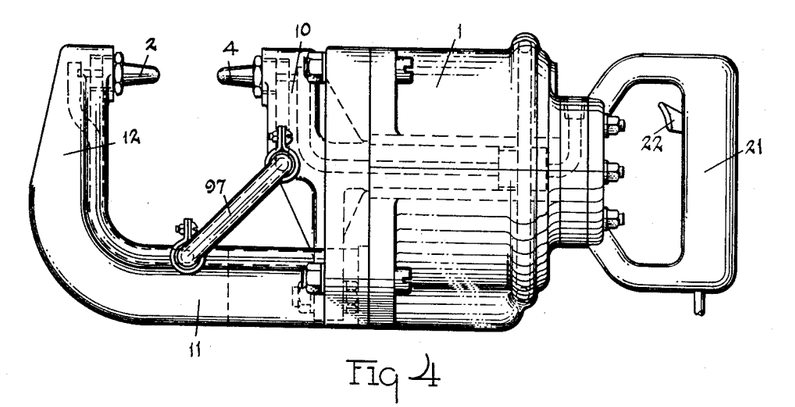
Fig. 4 illustrates a side view of the welder that may be used with the apparatus.
Figure 5:
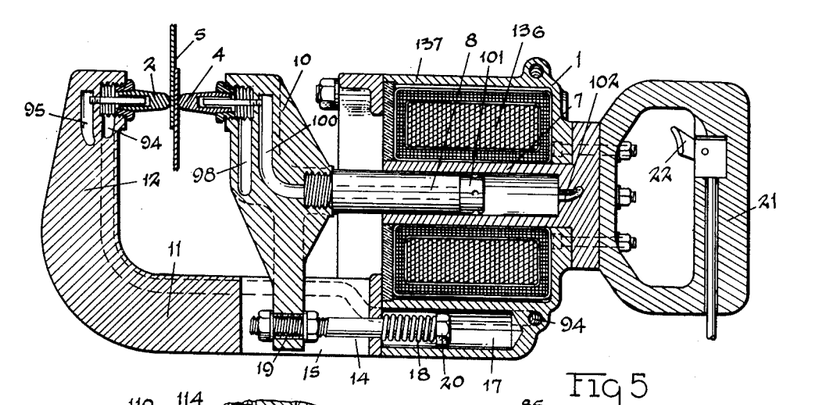
Fig. 5 is a view of a longitudinal section of the welder shown in Fig. 4.

The welder is provided with a cylinder 7 and a piston 8. The piston 8 may be hydraulically operated to move the welding terminal 4 against the work. The welding terminal may be mounted on an arm that is mechanically operated by the piston 8. In the form of construction shown, the welding terminal 4 is connected to the arm 10, and the arm 10 is connected to the piston 8. The welding terminal 2 may be connected to the welder by means of a bracket 11 having an arm 12 on which the welding terminal 2 is located in opposed relation to the welding terminal 4, whereby the operation of the piston 8 will cause the work 5 to be clamped between the welding terminals 2 and 4. To cause the return movement of the welding terminal 4 on the completion of the welds and release of the pressure in the cylinder 7, the arm 10 is connected to a spring pressed rod 14 located within the slot 15 formed in the bracket 11. The rod 14 extends into a hole 17 formed in the wall of the welder. A spring 18 is located intermediate the head of the bracket 11 and the head 20 of the rod 14 to resiliently bias the piston 8 toward its normal position, wherein the welding terminals 2 and 4 are separated from each other to enable ready location of the welding terminals on opposite sides of the work and in position to produce the welds. The rod is electrically insulated from the arm 10 by the bushing and washers 19 that are located in the arm 10 and surround the rod 14.

The welder may be provided with a suitable handle, such as the handle 21 for locating the welder in position. The handle may also be provided with a suitable switch 22 for remotely controlling the means that produce the pressure in the liquid located in the cylinder 7 to cause, not only the production of the welding pressure, but also the flow of the welding current.

Figures 8, 9, 10:
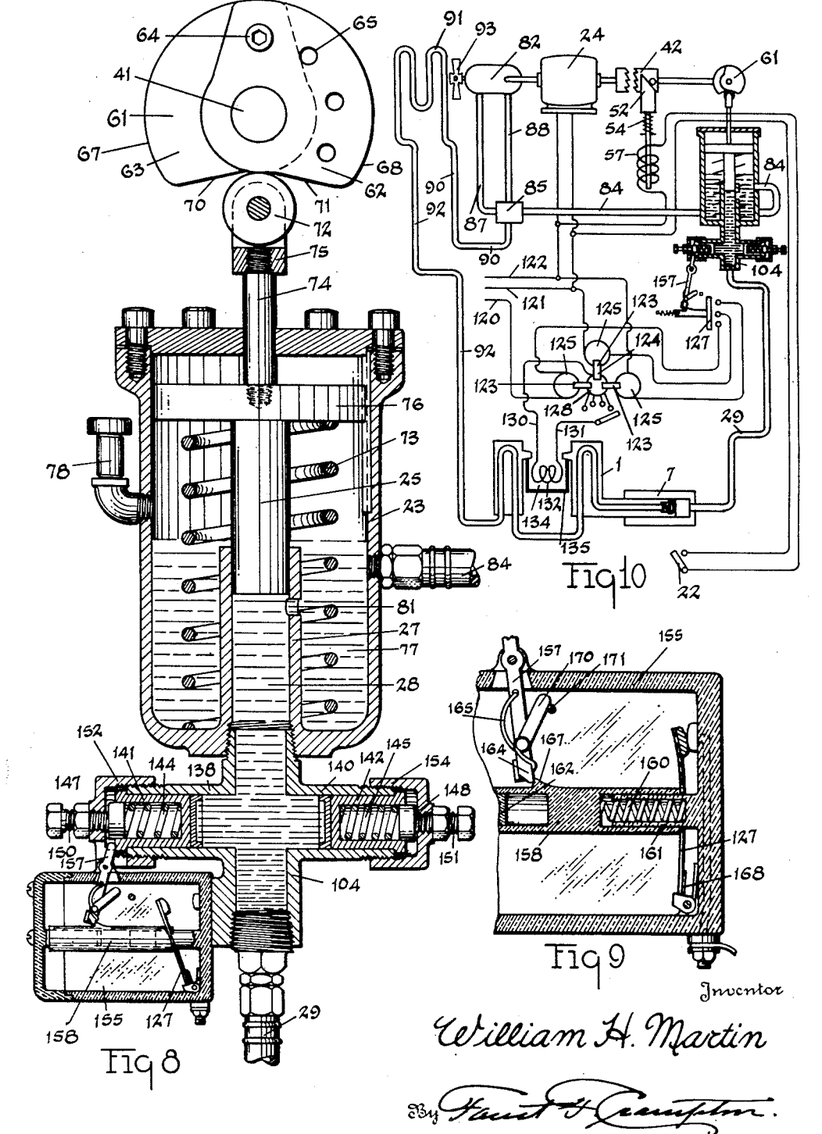
Fig. 8 illustrates a central vertical section of a means for hydraulically operating the welder.
Fig. 9 is an enlarged view of the switch shown in Fig. 8 for causing the flow of a welding current when the pressure of the liquid rises to a degree such as to produce a welding pressure of the welding terminals on the work.
Fig. 10 illustrates diagrammatically the connection of the parts of the apparatus.

The welder 1 is hydraulically operated by a motor means, such as the electric motor 24 that mechanically operates a hydraulic pressure device 23, such as a piston 25 located in a cylinder 27, to transmit pressure produced by the motor means through a liquid 28 located in the cylinder 27 and the pipe 29 that connects with the cylinder 7 of the welder 1. The mechanical connection between the motor means and the piston 25 is electrically controlled by the switch 22 located in the handle of the welder to produce the welding pressure when the welder has been located in desired positions with reference to the work by the operator.

Figure 1:
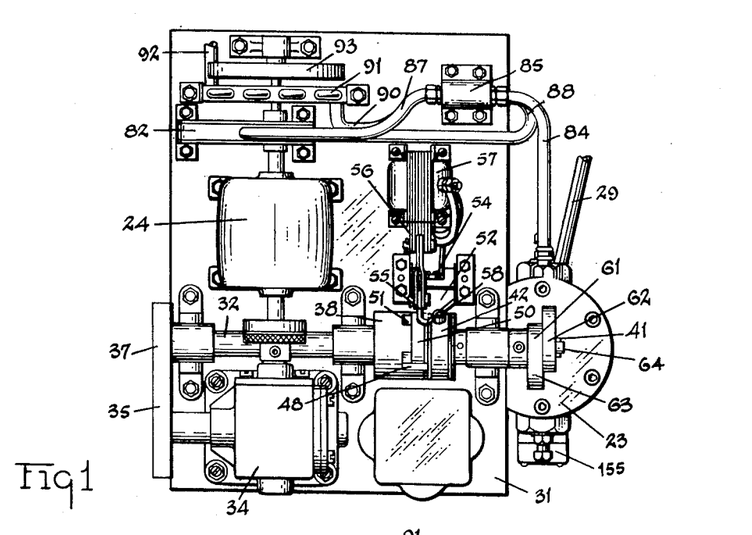
Fig. 1 illustrates a top view of parts of the apparatus that may be mounted on a suitable panel or upon a suitable conveyance supported for ready transportation to move the assembled parts to points of location of the work.
Figure 2:
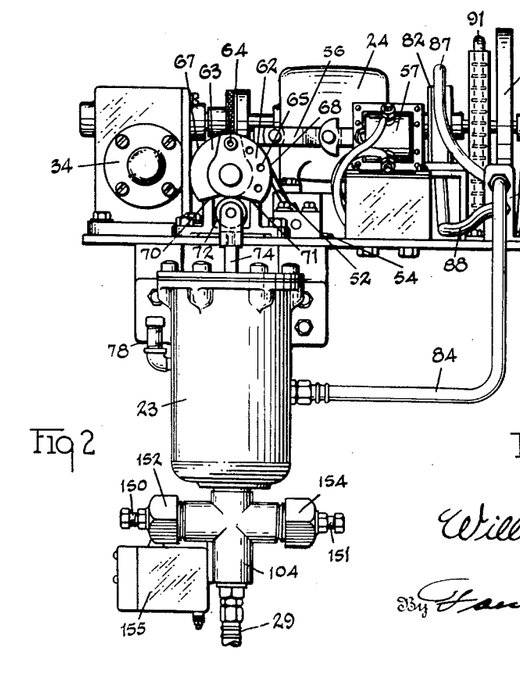
Fig. 2 is a side view of the assembled parts shown in Fig. 1.
Figure 3:
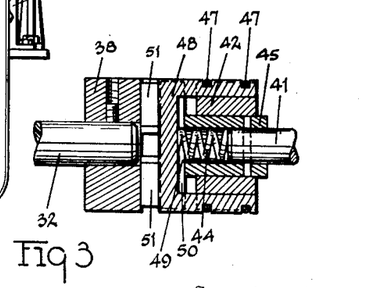
Fig. 3 illustrates a section of a clutch jaw for connecting the hydraulic pressure device to the motor means.

The motor 24 may be suitably mounted on a plate or panel 31. It is connected to a shaft 32 through suitable reducing gear contained in the gear box 34 and also through the gear wheels 35 and 37. The shaft 32 is provided with a clutch member 38 that is continuously rotated by the motor 24. A second shaft 41 is located in alignment with the shaft 32, and a U-shaped clutch jaw 48 is connected to sleeve 42 that is slidably supported on a sleeve 45 that is connected to the shaft 41. The jaw 48 is spring pressed by the spring 44 toward the end surface of the clutch member 38. The spring 44 is located in the sleeve 45 and intermediate the end of the shaft and the clutch jaw 48. The U-shaped jaw 48 is secured to the sleeve 42 by the wire rings 47. The legs of the U-shaped jaw 48 extends through a slot 49 formed in a flange 50 located on the end of the sleeve 45. When the recesses 51 of the clutch member 38 are located in alignment with the cross part of the U-shaped jaw 48, the jaw 48 engages in the recesses 51 and the clutch member 38 and the clutch jaw 48 are interconnected to rotate the shaft 41 by the motor 24.

The shafts 32 and 41 are disconnected by a longitudinal movement of the clutch jaw 48 against the pressure of the spring 44. The clutch jaw 48 is withdrawn by the operation of a cam plate 52 hingedly supported on the panel 31 by means of suitable brackets and spring pressed by means of a spring 54 to press the nose of the cam plate against the cylindrical surface of the flange 50. The cam plate is provided with a lug 55, and a link 56 is connected to the lug 55. The link 56 is connected to a core of a solenoid 57 that operates electro-magnetically to swing the cam plate 52 away from the cylindrical surface of the slotted flange 50 and the clutch jaw 48. The clutch jaw 48 has a roller 58 pinned to the outer surface of the sleeve 42 and in position to engage the edge of the cam plate 52 when the sleeve 42 is rotated while the clutch jaw is engaged with the clutch member 38. The cam plate 52 operating upon the roller 58 slidably moves the clutch jaw 48 along the sleeve 45 and withdraws the jaw 48 from the recess 51 formed in the clutch member 38 to disconnect the shaft 41 from the shaft 32. The rotation of the shaft 41 is thus discontinued when the solenoid 57 is deenergized and the cam plate is released and moved into engaging relation with the roller 58 by the spring 54.

A cam 61 is connected to the outer end of the shaft 41. The cam 61 comprises a pair of relatively adjustable members 62 and 63. One of the members, such as the member 63 is keyed to the shaft 41, and the member 62 is connected to the member 63 by means of a pin 64 that may be inserted in any one of a plurality of openings 65 ranged along a circular edge of the member 62. The member 63 is provided with an opening with which any one of the openings 65 of the member 62 may register, and the members may be connected together by the insertion of the pin 64 through any one of the openings in the member 62 and the opening in the member 63. The cam members 62 and 63 have circular edges 67 and 68 that are of the same radius and edge parts 70 and 71 located ex-radially to form a recess in the cam 61 and operate the piston 25 of the hydraulic pressure device 23. The piston 25 carries a roller 72 and is spring pressed toward the axis of rotation of the shaft 41 by the spring 73. The piston 25 is provided with a stem 74 which is connected to a yoke 75. The roller 72 is rotatably supported in the yoke 75. The upper end of the piston and the stem is guided by a head 76 that freely slides within the pressure device 23. The roller 72 has a length sufficient to be engaged by the edges 71, 68, 67, and 70 of the cam 61 to depress the piston 25 to permit the piston to rise within the recess formed by the angular relation of the edges 70 and 71 of the cam members. The cam 61 will continue to rotate and reciprocate the piston 25 until the switch 22 on the welder 1 is released by the operator to de-energize the solenoid 57.

The roller 58 is located relative to the sleeve 42 to engage the edge of the cam plate 52 and separate the clutch parts at a point to dispose the roller 72 substantially intermediate the edges 70 and 71 of the cam members 62 and 63, the roller 72 being disposed substantially in vertical axial alignment with the piston 25 and the axis of the shaft 41. Thus, a single reciprocation of the piston 25 may be produced merely by releasing the clutch jaw 42 to cause engagement with the clutch member 38 by the operation of the switch 22 and immediately opening the switch 22, which will cause the shafts 32 and 41 to perform a single rotation, since upon completion of the rotation, the roller 58 will be engaged by the cam plate 52. If desired, the reciprocation may be continued merely by holding the switch 22 closed. The reciprocatory movements may be terminated by release of the switch 22.

The piston 25, the cylinder 27, and the spring 73 are located in a reservoir 77 formed within the pressure device 23. Preferably the pressure device 23 is formed to have an annular chamber surrounding the cylinder 27 that forms the reservoir. It is provided with a suitable breather opening formed through the pipe 78 whereby the parts of the apparatus through which the liquid flows may be filled, and the level of the liquid in the reservoir 77 may be raised to a desired point.

The reservoir of the pressure device 23 communicates with the interior of the cylinder 27 through an opening 81 formed in the cylinder at the lower end of the piston 25 when the piston 25 is raised by the operation of the spring 26. The liquid 28 is circulated by means of a rotary pump, such as a gear pump 82 which is operated by the motor 24. The liquid is drawn from the reservoir through a pipe 84, a spring pressed short circuit valve 85, and a pipe 87 to the pump 82 whence it is forced through a pipe 88, the short circuit valve 85, the pipe 90, the radiator 91, and the flexible pipe 92 which is connected to the welder. The radiator is disposed in front of a fan 93 for air cooling the liquid as it passes through the radiator. The fan is rotated by the motor 24. The welder 1 has a passageway 94 that extends through the bracket 11 and the arm 12 and through the interior of the welding point 5 to the passageway 95. The passageway 95 is connected by means of a flexible pipe 97 with a passageway 98 that communicates with the interior of the welding terminal 4. The interior of the terminal 4 is connected with the passageway 100 that extends through the piston 8 and a valve 101 located on the inner end of the piston 8 where the liquid enters the cylinder 7. The welder has a passageway 102 that is connected to the cylinder, and the liquid passes through the passageway 102 to the small flexible pipe 29 that connects the welder with a connector 104 that is connected to the lower end of the cylinder 27 of the pressure device 23. The liquid enters the chamber of the pressure device 23, passes through the opening 81 located in the wall of the cylinder 27, and then flows into the pipe 84 and thus circulates through the radiator and the welder until the opening 81 is closed by the piston 27.

In order to raise the pressure in the liquid located in the cylinder 27, the pipe 29, and the cylinder 7 to a welding pressure, a return movement is produced in the pipe 29 in a direction contra the direction normally produced by the pump 82 to close the valve 101. When the piston 25 is operated by the motor means, it closes the opening 81, produces a counter flow of the liquid, and closes the valve 101 and thus entraps the portion of the liquid between the two pistons.

Figure 7:
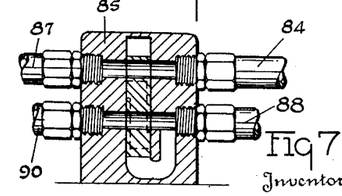
Fig. 7 illustrates a short circuit valve.

The valve 101 may be located at any point in the feed line of the normal circuit, that is, at any point intermediate the inlet of the fluid into the cylinder 7 of the welder 1 and the pump 82. Preferably, the feed and the return lines of the pump are provided with the valve 85 for short-circuiting the flow of the current through the welder when the liquid is entrapped, although in certain pump constructions, particularly of the rotary type, the back pressure causes slippage of the liquid in the pump itself when the pressure produced by the pump in the feed line rises above a certain point. Where a short-circuit valve, such as the valve 85, is used, the valve 101 for closing the feed line of the liquid to the welder 1 should be located at a point intermediate the inlet to the cylinder 7 and the valve 85 and preferably at a point as close as possible to the inlet of the cylinder 7 in order to produce immediate responsive movement of the piston 8 to the movement of the piston 25.

Figure 6:
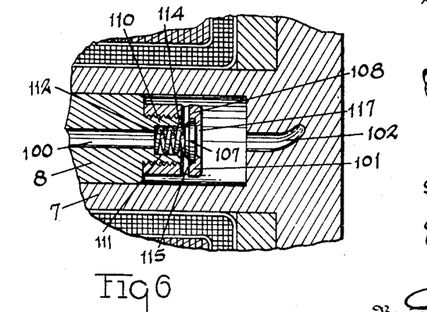
Fig. 6 illustrates an enlarged view of a part of a valve shown in Fig. 5.

The valve 101 located on the end of the piston 8 comprises a spring-pressed movable valve member 107 that is movable intermediate a cap 108 and a stud 110 formed on the end of the piston 8. The cap 108 may be threaded on the stud to connect the cap with the inner end of the piston 8. The stud 110 may be provided with a socket 111 in which a light pressure spring 112 is located and disposed intermediate the valve member 107 and the bottom of the socket. The end of the stud 110 is provided with a seat 114 on which the movable valve member 107 may be seated to close the valve. The cap 108 is provided with small laterally extending openings 115 that connect with the passageway 100 intermediate the movable valve member 107 and the seat 114. When the valve is closed it closes the restricted passageways 115 that extend laterally from the side edge part of the movable valve member.

The end of the cap 108 is provided with a relatively large opening 117. Normally the peripheral portion of the movable valve member 107 engages a flange on the cap 108. Upon the closure of the opening 81 in the cylinder 27 by the piston 25, the pressure is transmitted immediately to the movable valve member 107 through the opening 117, forming the inlet of the cylinder 8, to close the valve. The continued movement of the end of the piston 25 transmits the pressure exerted by the cam 61 through the liquid 28 to the piston 8 and causes the piston that is mechanically connected to the welding terminal 4 to move the welding terminal against the work 5 and clamp the work against the welding terminal 2 and produce the required pressure on the work in advance of producing the flow of the welding current through the work.

The welding current is inductively produced from a source of supply of electric current such as that produced by a commercial three phase current circuit that is connected to the system through the main lines 120, 121, and 122. A transforming and frequency changing means 124 is connected to the lines 120, 121, and 122. The frequency changing means comprises three closed magnetic circuits formed by three cores 123 and the primary coils 125, each of which surrounds a core. The cores are connected with the lines 120, 121, and 122 and are connected together by a switch 127. The three-phase current having the usual commercial voltage flows through the primary coils 125 when the switch is closed which produces inductively a current in the secondary coil 128 that embraces a part of each core. The secondary current thus induced has a phase modification that is a result of the alternating currents passing through the primaries. The current quantity and the number of turns of each of the primaries and the cross-sectional areas of the magnetic cores are such as to produce a magnetic saturation to produce in the secondary a single-phase current having a frequency triple that of the phase frequency of the main line.

The coil 128 may be provided with suitable taps to selectively vary the effective voltage producible by the secondary coil 128. The secondary current from the transforming and frequency changing means 124 is connected by the lines 130 and 131 to the primary 132 of the transformer 134 that surrounds the cylinder 7 of the welder. The primary 132 is wound about a closed magnetic circuit formed by a hollow cylindrical magnetic core 136 of the type well known in the art. The number of turns of the primary 132 is such as to produce a large current in the secondary 135 having, preferably, but one or two turns. In the form of construction shown, the secondary has but a single turn. The potential of the secondary 135 and consequently its current quantity is varied by varying the potential of the primary 132 produced by selectively connecting one or the other of the taps of the secondary 128 of the current transforming and frequency changing means 124 and enables the use of a light weight transformer in the welder to transform a relatively high frequency current into a current of a selected low potential and large amperage in the secondary that is located in close current conducting relation to the terminals of the welder and eliminates the large current conducting cables, large heat loss by flow of large currents through the cable, and the corresponding large potential drop in the flow of the large current in welders of the type commonly used.

The welder is provided with parts formed of high conductive metal, such as copper, that partially enclose and extend through the primary 132 and the core 136. Thus, the primary 132 causes the flow of the welding current through the shell 137, the cylinder 7, the piston 8, the arm 10 that interconnects the piston 8 with the welding terminal 4, the work 5, the welding terminal 2, the arm 10 and the bracket 11 which is connected to the shell 137 of the welder.

The welding current is produced in the welder when the pressure in the liquid 28 produced by the piston 25 reaches a point above the welding pressure. The connector 104 has a pair of hydraulic pressure responsive devices, one for automatically operating the switch 127 that controls the supply of the current to the primary 125 of the current transforming and frequency changing means 124 to produce the welding current, and the other for resiliently responding to the movement of the piston 25 subsequent to the production of the welding pressure and the flow of the welding current to maintain a pressure above the required welding pressure and allow for inward movement of the piston 25 and prevent extreme rise of pressure in the liquid after the welding terminal has engaged the work and is pressed thereagainst at a suitable welding pressure. The connector 104 that interconnects the cylinder 27 with the pipe 29 is provided with the cylinders 138 and 140 having preferably hollow pistons 141 and 142 that are spring pressed by relatively stiff springs 144 and 145. The springs 144 and 145 are located within the hollow pistons and intermediate the bottoms of the pistons and the heads 147 and 148 located on the ends of the screws 150 and 151. The screws are adjustably mounted in the caps 152 and 154. The caps 152 and 154 are threaded on to the cylinders 138 and 140. The heads may be adjusted by the screws 150 and 151 to produce a desired reactive spring pressure on the liquid 28 to yieldingly resist movement of the pistons 141 and 142. The reactive resistance of the spring 145 may be adjusted to produce a slightly greater varying resistance to the movement of the piston 142 than that which is produced by the spring 144 on the piston 141. Thus, the piston 142 will be moved according to the liquid displacement that may be produced by the piston 25 subsequent to the engagement of the work and closure of the switch 127 to maintain the welding pressure and prevent extreme pressure in the flexible pipe connecting the pressure device and the welder.

The switch 127 is mounted in a housing that is connected to the connector 104. The switch 127 is mechanically connected to the piston 141 through a lever 157. The lever is pivotally mounted on the housing 155. The lever is engaged by the end edge of the piston 141 that operates the lever 157 to move a sleeve 158 against the pressure of a spring 160 located in one end of the sleeve 158 and a barrel 161 that is connected to one end of the housing 155. The other end of the sleeve 158 move on a pin 162 that guides the sleeve 158 in its movement produced by the movement of the piston 141. The lever 157 is provided with a dog 164 that is connected to the lever 157 by a knife blade joint and is spring pressed by a spring 165 to bias the dog 164 in a direction to normally extend the dog endwise from the lever 157. The dog 164 engages a shoulder 167 formed on the sleeve 158 and when the piston 141 is operated, the sleeve is moved by the lever, and the switch 127 is closed. Preferably the movable member of the switch 127 has a yielding part to allow for movement of the sleeve 158 and insure continued contact of the movable switch member with the fixed contacts of the switch. During the outward movement of the piston 141 and subsequent to the closure of the switch, the sleeve 158 is released, and the switch under the pressure of the spring 168 is automatically opened at a slightly higher pressure to produce a short closure period during which the welding current flows through the work. Just in advance of the engagement of the piston 141 with the end of the cap 152, the dog 164 is tripped to release the sleeve 158 which, under the pressure of the spring 160, is returned to its normal position and releases the switch 127. The dog 164 is provided with an arm 170 which engages a pin 171 mounted on the wall of the housing 155 to cause the dog 164 to pivot on the end of the lever 157 as the lever is moved by the piston 141 until the dog 164 disengages and passes over the edge of the shoulder 167. When the lever 157 is released by the return of the piston 141, the spring 165 restores the position of the dog with reference to the lever 157.

The spring 145 is so formed and is adjusted by the screw 151 to produce a protracted movement of the piston 142 to maintain a welding pressure during the pressure period. The period of the current flow during the rise in pressure may be varied by adjusting the tension of the springs 144 and 145 by the screws 150 and 151 and one relative to the other to produce a relative prompt or delayed response of the switch closing movement, and a prompt or delayed opening of the switch to vary the length of the period of the flow in the welding current relative to the period of the rise in pressure of the liquid.

Thus, upon the operation of the switch 22 by the operator, the current through the solenoid 57 releases the clutch jaw 42 to connect the cam 61 with the rotating shaft of the motor 24 which moves the piston 25 of the pressure device 23 to close the opening 81 and transmit pressure to the movable valve member 107 through the large opening 117 formed in the end of the cap 108 in a direction reverse to the normal flow of the liquid produced by the pump 82 to close the valve 101 and confine the liquid within the cylinder 27, the connector 104, the pipe 29, and the cylinder 7. The piston 8 is then moved in response to the movement of the piston 25. If the switch 22 is released by the operator before the cam 61 makes a complete rotation, a single weld will be produced. If the switch 22 is held closed during a plurality of revolutions of the cam, the welder may be shifted from point to point along the work to produce stitch welding.

Figure 11:
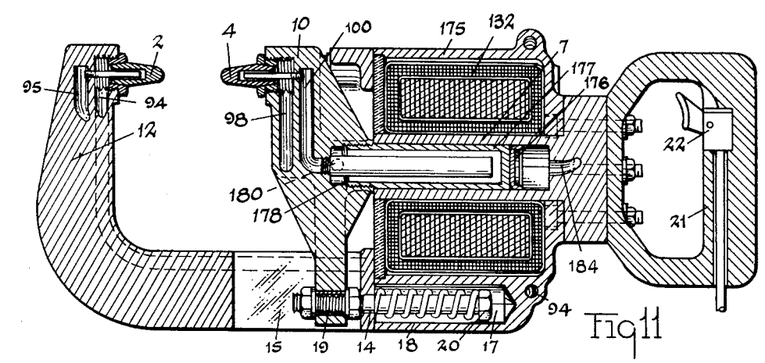
Fig. 11 illustrates a section of the welder having a modified form of piston for conducting a cooling liquid in heat conductive relation with respect to the primary and secondary circuits of the welder transformer.
Figure 12:
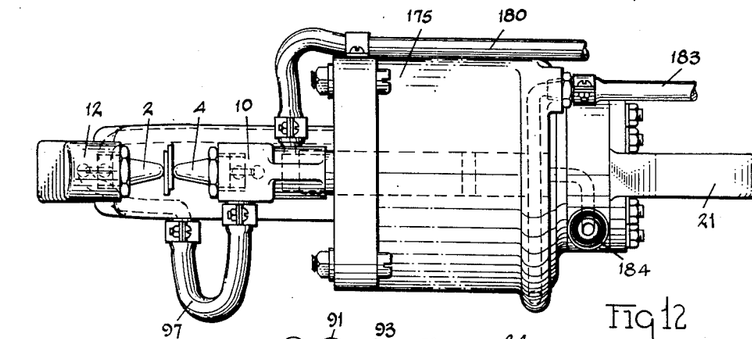
Fig. 12 illustrates a top view of the welder shown in Fig. 11.
Figure 13:
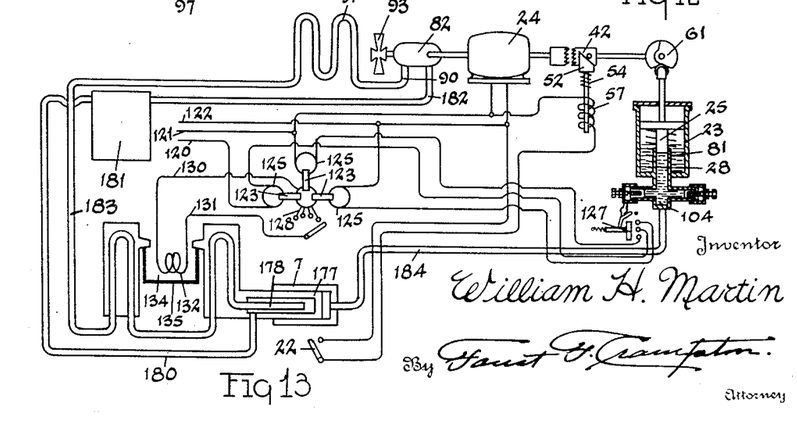
Fig. 13 illustrates diagrammatically the connections of the welder to the parts of the apparatus illustrated in Figs. 1 and 2.

In the form of the apparatus illustrated in Figs. 11, 12, and 13, many of the parts of the welder 175 are similar to those of the welder 1 illustrated in Figs. 4, 5, and 6, except that the structure of the welder 175 directs the flow of the cooling liquid through the cylinder but is confined within the piston and in heat conductive relation with respect to the cylinder 7 and the primary coil 132 and the parts of the secondary circuit including the wall of the cylinder, the body of the piston, and the welding points.

The piston 177 of the welder 175 is preferably formed hollow and has a closed inner end. The piston is provided with a flexible sealing cup 176. A tube 178 is connected to the arm 10 to which the hollow piston is connected and extends substantially throughout the length of the piston to near the closed inner end of the piston to form an annular chamber within the piston. A cooling liquid is circulated through the piston and thus through the interior of the cylinder and in heat conductive relation to the piston, the cylinder, and the primary of the welder that is mounted on or surrounds the cylinder. The wall of the piston may be formed relatively thin and liquid may be conducted into the piston by the tube or may be discharged from the piston through the tube.

In the form of the construction shown, the cooling liquid is conducted through the tube 178 to the inner end of the piston. The liquid moves over the inner surface of the hollow piston to a flexible pipe 180 that is connected to a reservoir 181. The liquid is drawn from the reservoir 181 through a pipe 182 by the operation of the pump 82 driven by the motor 24 and is forced through the radiator 91 and through the pipe 183 to the welder. The liquid enters the passageway and flows through the welding point 2, the passageway 95, the flexible pipe 97, the passageway 98, the welding point 4 and into the passageway 100 to the tube 178. The liquid is thus circulated through the tube 178, the piston 177, and the welding points. The cylinder 7 is connected by a flexible, substantially non-expansible pipe 184 to the pressure device 23 which is actuated by the cam 61. The pressure produced by the cam 61 on the piston 25 is transmitted through the liquid 28 to the cylinder 7 of the welder, when the piston 25 is moved sufficiently to close the opening 81 that communicates with the reservoir 77 of the pressure device, and press the welding points against the work. When the pressure has reached the required welding pressure, the switch 127 is operated to complete the circuit through the primaries 125 of the current transforming and frequency changing means 123 to cause the flow of the high frequency current through the secondary 128 to the primary 132 of the welder transformer which produces the flow of the welding current through the cylinder 7, the piston 177, the welding points 2 and 4, and the arms that support the welding points, and the shell 137 of the welder in the same manner that the current flows through the parts of the welder shown in Figs. 4 and 5 as described above.

If desired, water may be used as a cooling liquid and the apparatus may be connected to any source of supply, of water instead of to a pump, such as the pump 82. The liquid 28 may be oil or a glycerine mixture. Preferably a liquid is used that is non-freezable or non-congealable and does not affect insulating parts of the electrical apparatus with which the liquid may come in contact in the operation of the welder.

I claim:

1. In a welder, a piston and a cylinder, a welding point operated by the pressure in the cylinder and electrically connected to the piston, means for producing high electric contact pressure of the piston against the cylinder, a primary of a transformer inductively located with respect to the cylinder to produce the flow of a secondary welding current through the cylinder, the piston, and the welding point.

2. In a welder, a cylinder and a piston, a welding point electrically connected to the piston and operated by the pressure in the cylinder, and means for producing an electric contact pressure of the piston against the cylinder according to the pressure of the welding point against the work, a primary of a transformer inductively located with respect to the cylinder for producing the flow of a secondary welding current through the cylinder wall, the piston, and the welding point.

3. In a welder, a pressure means comprising a piston and a cylinder, a welding point connected to the piston and operated by the pressure in the cylinder, a primary of a transformer inductively located with respect to the cylinder for producing a secondary welding current through the cylinder, a piston and the welding point, the work engaging end of the welding point located exaxially with respect to the axis of the cylinder for producing a high electric contact pressure between the end part of the piston and the cylinder wall when the welding point engages the work.

4. In a welding apparatus, a hydraulic pressure device, a rotor means for mechanically operating the pressure device, a cylinder connected to the pressure device and having a piston, a welding point electrically connected to the cylinder and hydraulically operated by the pressure in the cylinder to engage the work, the welder having means for conducting the liquid through the cylinder and in heat transmitting relation to the welding point, means for restricting the flow of the liquid to raise the pressure of the liquid in the cylinder for pressing the welding point against the work, means for raising the pressure of the piston against the wall of the cylinder when the welding point engages the work, a transformer, the primary of the transformer inductively located with respect to the cylinder for producing the flow of a welding current through the cylinder wall and the piston to the welding point.

5. In a welding apparatus, a welder having a cylinder and a piston, a welding point operated by the pressure produced in the cylinder, a transformer, a primary of the transformer inductively located with respect to the cylinder for producing the flow of a welding current through the wall of the cylinder and the welding point, the welder having means for conducting liquid through the cylinder and in heat transmitting relation to the cylinder and the welding point, a hydraulic device for transmitting pressure through the liquid, a pressure means for raising the pressure of the liquid in the cylinder upon actuation of the hydraulic device to press the welding point against the work, a hydraulic means for resiliently resisting displacement of the liquid by the hydraulic device subsequent to the engagement of the work by the welding point.

6. In a welder, a piston and a cylinder, welding points operated by the pressure in the cylinder and electrically connected to the cylinder, the primary of a transformer inductively located with respect to the cylinder to produce a flow of a secondary welding current through the cylinder wall and the welding points, a source of supply of a cooling liquid, means for directing the flow of the cooling liquid in heat conductive relation to the primary coil and the cylinder wall.

7. In a welder, a piston and a cylinder, a welding point operated by the pressure in the cylinder and electrically connected to the cylinder, the primary of a transformer inductively located with respect to the cylinder to produce flow of a secondary welding current through the cylinder wall and the welding point, a source of supply of a cooling liquid, and means for conducting the liquid through the piston in heat conductive relation to the cylinder and through the welding point.

8. In a welder, a piston and a cylinder, a welding point connected to the piston and operated by the pressure in the cylinder, the primary of a transformer inductively located with respect to the cylinder and the piston to produce the flow of a secondary welding current through the cylinder wall, the piston, and the welding point, a source of supply of a cooling liquid, and means for conducting the liquid through the piston and in heat conductive relation with respect to the cylinder wall and the primary of the transformer.

9. In a welding apparatus, a pressure means having a cylinder and a piston, a rotative member for operating the piston, a welder having a welder cylinder and a welder piston located in the welder cylinder, a welding point connected to the piston, a flexible pipe connecting the said cylinders, a source of supply of liquid, means for directing the liquid into the cylinder of the pressure means, the pipe and the welder cylinder, means operated by the pressure means for entrapping the liquid in the pipe and the spaces of the cylinders connected by the pipe for transmitting pressure from the piston of the pressure means to the welder piston, a transformer, the primary of the transformer inductively located with respect to the welder cylinder and the piston, the welder cylinder and piston and the welding point forming a part of the secondary of the transformer, a source of electric current, and means controlled according to the pressure of the liquid in the pipe for connecting the primary of the transformer with the source of electric current for producing flow of the secondary current through the cylinder, the piston and the welding point when the welding point engages the work.

10. In a welding apparatus, a pressure means having a cylinder and a piston, means for operating the piston, a welder having a welder cylinder and piston, a welding point operated by the pressure in the cylinder, a source of supply of liquid, a flexible pipe connecting the said cylinders, the communicating spaces in the pipe and the cylinders filled with a liquid for transmitting the pressure from the pressure means to the welder cylinder for operating the piston and cylinder of the welder one relative to the other, a source of supply of electric welding current connected to the welding point, a pair of pressure devices operated by the pressure of the liquid, a switch operated by one of the pressure devices for causing flow of the welding current, means for yieldingly resisting the operation of each of the pressure devices, means for adjusting the pressure devices to yieldingly resist the movement of the pressure devices by the rise in the pressure of the liquid and vary the period of the flow of the welding current through the welding point relative to the period of the rise of pressure of the liquid produced by the pressure means.

11. In a welding apparatus, a pressure means, means for operating the pressure means, a welder having a welder cylinder hydraulically connected to the pressure means, a piston located in the cylinder, a welding point operated by the pressure in the cylinder, a flexible pipe connecting the cylinder to the pressure means, a source of supply of electric welding current connected to the welding point, a pair of pressure devices operated by the hydraulically transmitted pressure, a switch operated by one of the pressure devices for causing flow and cessation of flow of the welding current at different hydraulic pressure points, means for yieldingly resisting the operation of each of the pressure devices, means for adjusting the pressure devices to yieldingly resist movement of the pressure devices by the rise in the hydraulic pressure and vary the period of the flow of the welding current through the welding point relative to the period of the rise of the hydraulic pressure produced by the pressure means.

12. In a welding apparatus, a pressure means having a cylinder and a piston, means for operating the piston, a welder having a welder cylinder and a hollow welder piston located in the welder cylinder, a flexible pipe for connecting the welder cylinder to the first-named cylinder, a source of supply of liquid means for maintaining the communicating spaces of the pipe and the cylinders filled with a liquid for transmitting pressure from the pressure means to the welder cylinder, a welding point operated by the pressure in the welder cylinder, means for producing the flow of a welding current through the cylinder, the welding point and the work when the welding point engages the work, a second source of supply of liquid, and means for connecting the said second source of supply of liquid to the interior of the piston, cylinder and the welding point through which the liquid from the said second source normally freely flows for cooling the cylinder, the piston and the welding point.

13. In a welding apparatus, a pressure means having a cylinder and a piston, means for operating the piston, a welder having a welder cylinder and a hollow welder piston located in the welder cylinder, a welding point connected to the piston, a flexible pipe connecting the said cylinders, a source of electric current, a primary of a transformer inductively located with respect to the welder cylinder and piston, a source of supply of liquid, means for directing the liquid through the piston and the welding point in heat-conductive relation to the cylinder for cooling the cylinder, the piston and the welding point, the communicating spaces in the pipe and cylinders filled with a liquid for hydraulically transmitting pressures from the first-named cylinder to the welder cylinder, and means controlled according to the pressure of the liquid in the pipe for connecting the primary to the source of current for producing flow of a secondary current through the cylinder, the piston and the welding point when the welding point engages the work.

14. In a welding apparatus, a pressure means having a cylinder and a piston, a rotor driving means, a piston actuating member, means for connecting and disconnecting the member to the rotor for operating the piston according to the movement of the member by the rotor, a welder having a welder cylinder and a hollow piston, a welding point operated by the movement of the welder cylinder and piston one relative to the other, a flexible pipe connecting the said cylinders, means for maintaining the communicating spaces in the pipe and the cylinders substantially filled with a liquid for transmitting pressure from the piston of the pressure means to the welder piston, a transformer, the primary of the transformer inductively located with respect to the welder cylinder, the cylinder forming a part of the secondary of the transformer, means for conducting the secondary current to the welding point, a source of supply of liquid, means for directing a flow of the liquid from the said source through the welder piston in heat-conductive relation to the cylinder and the welding point, a source of electric current, and means controlled according to the pressure of the liquid in the pipe for connecting the primary of the transformer with the source of electric current for producing flow of the secondary current through the cylinder and the welding point when the welding point engages the work.

15. In a welder, a piston and a cylinder, a welding point operated by the pressure in the cylinder, a pressure device, means for operating the pressure device, means for connecting the pressure device to the cylinder, the connected spaces between the pressure device and the piston containing a liquid for hydraulically operating the piston to press the welding point against the work by the pressure device, a pressure means for yieldingly resisting the displacement of the liquid from the said spaces, a means for adjusting the pressure means for varying the pressure transmitted to the welder piston, a source of supply of current, a switch for producing a flow of welding current through the welding point, a second pressure means communicating with the said spaces for operating the switch when the pressure produced in the liquid by the pressure device reaches a predetermined point.

16. In a welder, a piston and a cylinder, a welding point operated by the pressure in the cylinder, a pressure device, means for operating the pressure device, means for connecting the pressure device to the cylinder, the connected spaces between the pressure device and the piston containing a liquid for hydraulically operating the piston to press the welding point against the work by the pressure device, means for yieldingly resisting the displacement of the liquid from the said spaces, a source of supply of current, a switch for producing a flow of welding current through the welding point, a pressure means communicating with the said spaces for operating the switch by the pressure produced in the liquid by the pressure device, means operated by the pressure means for opening the switch by a rise in pressure above that which produced closure of the switch, and means for adjusting the pressure means for varying the pressures at which the switch is closed and opened.

17. In a welder, a piston and a cylinder, a welding point operated by the pressure in the cylinder, a pressure device, means for operating the pressure device, means for connecting the pressure device to the cylinder, the connected spaces between the pressure device and the piston containing a liquid for hydraulically operating the piston to press the welding point against the work by the pressure device, means for yieldingly resisting the displacement of the liquid from the said spaces, means for adjusting the said yieldingly resisting means for varying the rate of rise in pressure of the liquid, a source of supply of current, a switch for producing a flow of welding current through the welding point, a pressure means communicating with the said spaces for operating the switch by the pressure produced in the liquid by the pressure device, and means operated by the pressure means for opening the switch by a rise in pressure above that which produced closure of the switch.

18. In a welder, a piston and a cylinder, a welding point operated by the pressure in the cylinder, a pressure device, means for operating the pressure device, means for connecting the pressure device to the cylinder, the connected spaces between the pressure device and the piston containing a liquid for hydraulically operating the piston to press the welding point against the work by the pressure device, means for yieldingly resisting the displacement of the liquid from the said spaces, means for adjusting the said yieldingly resisting means for varying the rate of rise in pressure of the liquid, a source of supply of current, a switch for producing a flow of welding current through the welding point, a pressure means communicating with the said spaces for operating the switch by the pressure produced in the liquid by the pressure device, means operated by the pressure means for opening the switch by a rise in pressure above that which produced closure of the switch, and means for adjusting the pressure means for varying the pressures at which the switch is opened and closed.

WILLIAM H. MARTIN.